M. M. MUDD.
SAFETY STEERING EQUALIZER FOR AUTOMOBILES.
APPLICATION FILED JAN. 5, 1914.
1,122,789. Patented Dec. 29, 1914.
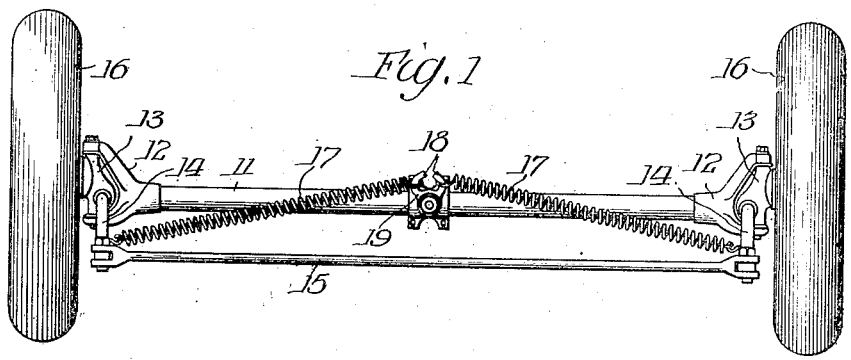
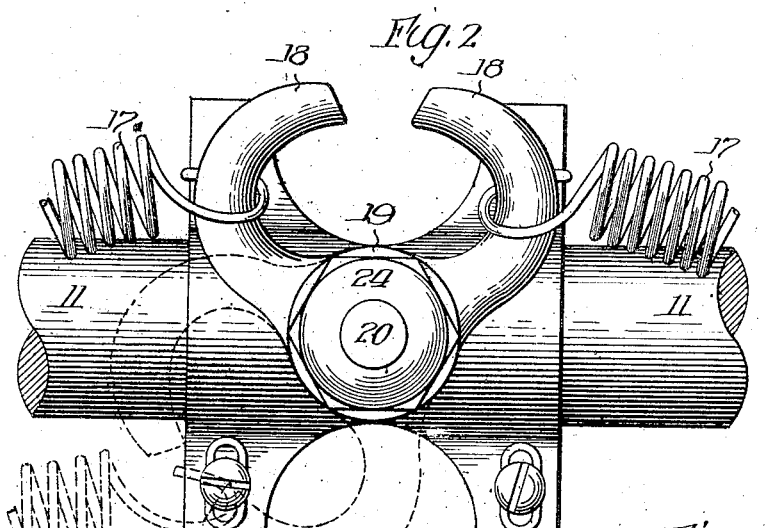
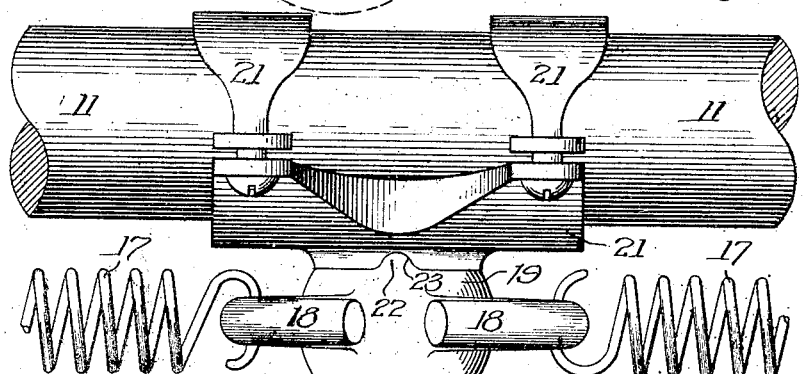

UNITED STATES PATENT OFFICE.

MELBOURNE M. MUDD, OF CHICAGO, ILLINOIS, ASSIGNOR TO EARLE D. MUDD, OF CHICAGO, ILLINOIS.

SAFETY STEERING-EQUALIZER FOR AUTOMOBILES.

1,122,789.  Specification of Letters Patent.  Patented Dec. 29, 1914.

Application filed January 5, 1914. Serial No. 810,320.

*To all whom it may concern:*

Be it known that I, MELBOURNE M. MUDD, a citizen of the United States, residing at Chicago, in the county of Cook and State of Illinois, have invented certain new and useful Improvements in Safety Steering-Equalizers for Automobiles, of which the following is a specification.

In the construction of motor vehicles it is usual to mount the front wheels upon stub axles connected to the front axle of the vehicle by means of so called steering knuckles pivoted upon a vertical axis, and to connect such knuckles to the steering wheel whereby the wheels are shifted in unison so as to maintain their parallelism with each other when turned at varying angles to the stationary front axle. It has been proposed to employ in such constructions centering or equalizing means tending to automatically restore the wheels to a position at right angles to the front axle, such for instance as springs attached to the knuckles and to a fixed point of support under tension, whereby as the wheels are turned in one direction or the other the tension of the two springs is unbalanced and their tendency is to return to a balanced condition and thus restore the wheels to the "straight ahead" position at right angles to the axle. An objection inherent in such centering or equalizing means is the liability of one of the springs to break thereby allowing the other to suddenly shift the wheels and cause the vehicle to leave the road wrecking the same and endangering the lives of those riding therein.

The principal object of the present invention is the inclusion in an equalizer construction of the general type referred to of safety means providing for the automatic release or otherwise throwing out of operation the equalizer element acting upon one wheel instantly upon the breaking of the equalizer element attached to the other wheel so that upon the breaking of one of the springs for example the other spring will be prevented by its release or otherwise from applying its force to suddenly disturb the direction of travel of the wheels.

In order that the invention and the manner of its operation may be readily understood a preferred embodiment of the same is set forth in the accompanying drawing and in the description based thereon. As, however, the invention is susceptible of embodiment in other and varied constructional forms the drawing and description are to be taken in an illustrative and not in an unnecessarily limiting sense.

In the drawing Figure 1 is a rear view of the front axle of a motor vehicle showing the invention applied to the steering mechanism; Fig. 2 is an enlarged detail view of the safety device showing its connection to the centering elements and in dotted lines to its release position; and Fig. 3 is a view similar to Fig. 2 but in top plan.

Herein the reference numeral 11 designates the front axle of the vehicle having bifurcated portions 12, 12 within which are mounted upon the vertical pivots the steering knuckles 13, 13, the latter having rearwardly extending arms 14, 14, the ends of which are connected by a rod 15 adapted to be connected in any approved manner with the steering wheel of the vehicle. This construction is well known and it will be readily understood that as the rod 15 and the arms 14, 14 are shifted laterally the knuckles 13, 13 and the wheels 16, 16 are shifted therewith, the latter thereby being caused to assume positions at different angles to the steering axle in order to effect the turning of the vehicle in either direction.

Centering or equalizing means are employed in order to cause the wheels to tend to a straight ahead position, that is to say, at right angles to the front axle. Such equalizing means are here illustrated as comprising a pair of springs 17, 17, each connected at their remote ends with one of the steering arms 14, while their adjacent ends are connected one to an arm 18 of a yoke member 19 fixedly mounted by means of a bolt 20 and the clamp 21 upon the axle 11. Each of the springs 17, 17 is normally under considerable tension and it is obvious that as the wheels 16 are manually shifted the tension of one of the springs will be increased while the other is diminished and that upon the removal of the force shifting the wheels the latter will be restored to their normal position by the restoration of the balances of the equalizing springs. It will be evident also that in case either of the springs 17 should break or otherwise be incapacitated from performing its function the tension of the other spring will immediately shift the wheels out of their central position and might cause serious results before the car could be brought again under the manual control of the driver. It is to guard against this danger that the safety feature of the present invention is designed and to this end the inner ends of the centering springs are anchored in the manner which will now be described.

Instead of forming the yoke 19 integral with the clamp 21 or attaching the same thereto in a rigid manner this yoke which serves as an anchorage for the centering springs 17, 17 is mounted upon the bolt 20 in such manner as to permit of its turning thereon under certain abnormal conditions while being held against turning under normal conditions. It will be observed by reference to Fig. 3 that the boss of the yoke 19 is provided with an integral projection or stud 22 which fits within a corresponding recess 23 formed in the front face of the clamp 21, the stud and recess having inclined walls. The yoke is held firmly but not unyieldingly against the clamp with the stud in engagement with the recess by means of a nut 24 acting through a spring washer 25. The force exerted by means of the nut and spring 25 upon the yoke 19 is sufficient to maintain the stud in engagement with the recess under all normal conditions of operation, but is insufficient to maintain such engagement against the unopposed force of either of the springs 17. Wherefore, it follows that in the event of the breaking of one of the centering springs 17 the pull exerted by the remaining spring is sufficient to cause the inclined walls of the stud 22 to ride up the inclined wall of the recess 23 against the tension of the spring washer 25 and permit the yoke to tilt quickly to the position shown in dotted lines in Fig. 2, the loop of the spring 17 snapping off the end of the arm 18 and out through the opening between the ends of said arms. It will thus be seen that upon the breaking or otherwise rendering inoperative of one of the centering springs the tension of the other upon the steering arm is automatically and instantly released so that any danger of the vehicle being caused to swerve to one side is obviated.

I claim:

1. In a device of the character described, the combination with centering means for the steering wheels of a vehicle comprising elements acting upon the two wheels, one only of said elements being strained when the wheels are steered in one side direction from the straightahead position, and the other element only being strained when the wheels are steered in the opposite side direction, of a safety device actuated by the incapacitation of the centering element for one wheel to automatically render the other centering element inoperative, substantially as described.

2. In a device of the character described, the combination with centering means for the steering wheels of a vehicle comprising elements acting upon the two wheels, one only of said elements being strained when the wheels are steered in one side direction from the straightahead position, the other element only being strained when the wheels are steered in the opposite side direction, of a safety device actuated upon the breaking of the centering element for one wheel to automatically release the other centering element, substantially as described.

3. In a device of the character described, the combination of centering means for the steering wheels of a vehicle, comprising a pair of springs acting upon the two wheels, one only of said springs being extended when the wheels are steered in one side direction from the straightahead position, the other spring only being extended when the wheels are steered in the opposite side direction, and a safety device actuated upon the incapacitation of one of the springs to automatically render inoperative the other spring, substantially as described.

4. In a device of the character described, the combination of centering elements connected at their one end to the steering mechanism of the two wheels, one only of said elements being strained when the wheels are steered in one side direction from the straightahead position, the other element only being strained when the wheels are steered in the opposite side direction, and a joint anchorage for the other ends of the two elements, said anchorage being arranged to automatically release the remaining element upon the accidental incapacitation of the other, substantially as described.

5. In a device of the character described, the combination of a pair of centering springs connected at their one end to the steering mechanism of the two wheels, one only of said springs being extended when the wheels are steered in one side direction from the straightahead position, the other spring only being extended when the wheels are steered in the opposite side direction, and a joint anchorage for the other ends of the two springs, said anchorage being arranged to automatically release the remaining spring upon the accidental release of the other spring, substantially as described.

6. In a device of the character described, the combination of centering elements connected at their one end to the steering mechanism of the two wheels, and a joint anchorage for the other ends of the two elements, said anchorage comprising a yoke member pivotally mounted on a fixed support and engaging the adjacent ends of the centering elements with its two arms, the said anchorage arranged to tilt upon its pivot and release the remaining element upon the accidental incapacitation of the other element, substantially as described.

7. In a device of the character described, the combination of centering springs connected at their one end to the steering mechanism of the two wheels, and a joint anchorage for the other ends of the two springs, said anchorage comprising a yoke member pivotally mounted on the fixed support and engaging the adjacent ends of the springs with its two arms, the said anchorage arranged to tilt upon its pivot and release the remaining spring upon the accidental release of the other spring, substantially as described.

8. In a device of the character described, the combination of centering elements connected at their one end to the steering mechanism of the two wheels, and a joint anchorage for the other ends of the two elements, said anchorage comprising a yoke member pivotally mounted on a fixed support and engaging the adjacent ends of the centering elements with its two arms, the said anchorage arranged to tilt upon its pivot and release the remaining element upon the accidental incapacitation of the other element, and means to prevent the tilting of the yoke under normal conditions, substantially as described.

9. In a device of the character described, the combination of centering springs connected at their one end to the steering mechanism of the two wheels, and a joint anchorage for the other ends of the two springs, said anchorage comprising a yoke member pivotally mounted on the fixed support and engaging the adjacent ends of the springs with its two arms, the said anchorage arranged to tilt upon its pivot and release the remaining spring upon the accidental release of the other spring, and a friction lock for the yoke arranged to yield only upon the release of one of the springs, substantially as described.

10. In a device of the character described, the combination of centering springs connected at their one end to the steering mechanism of the two wheels, and a joint anchorage for the other end of the two springs, said anchorage comprising a yoke member engaging with its two arms the adjacent ends of the two springs, a clamp mounted upon a fixed support intermediate the connection of the springs with the steering mechanism, means for yieldingly mounting the yoke upon the clamp, the opposed faces of the yoke and clamp having interengaging portions acting to frictionally lock the yoke against turning, the mounting of the clamp and yoke arranged to yield and permit the release of the friction lock upon the incapacitation of either of the springs, substantially as described.

11. In a device of the character described, the combination of centering springs connected at their one end to the steering mechanism of the two wheels, and a joint anchorage for the other ends of the two springs, said anchorage comprising a transversely apertured yoke member engaging with its two arms the adjacent ends of the centering springs, a clamp fixed upon the front axle intermediate the connection of the centering springs with the steering mechanism, a bolt extending from the clamp through the aperture of the yoke, a nut upon the end of the bolt, and a spring between the nut and yoke, the opposed faces of the nut and yoke provided with a stud and recess having inclined walls whereby to maintain a frictional lock between the yoke and clamp under normal conditions and to permit the disengagement of the lock and tilting of the clamp upon the release of one of the springs to effect the release of the other spring, substantially as described.

In testimony whereof I have hereunto signed my name in the presence of two subscribing witnesses.

MELBOURNE M. MUDD.

Witnesses:
WALTER M. FULLER,
T. D. BUTLER.